Sept. 19, 1933. H. FOX Re. 18,954
UPHOLSTERY EDGE
Original Filed July 22, 1931
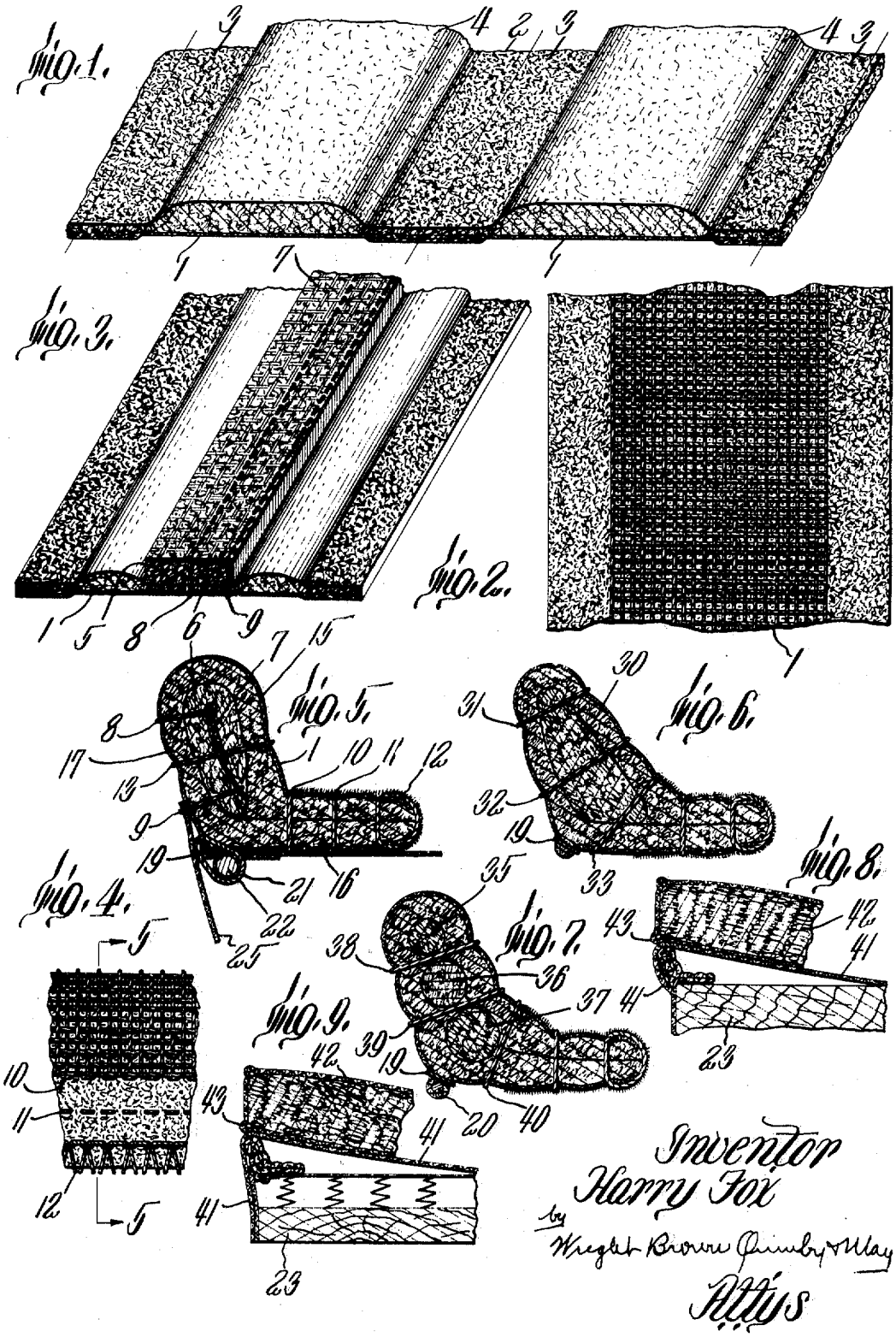

Reissued Sept. 19, 1933 Re. 18,954

UNITED STATES PATENT OFFICE 18,954

UPHOLSTERY EDGE

Harry Fox, Lowell, Mass., assignor to The Fox Edge Co. Inc., Lowell, Mass., a corporation of Massachusetts Original No. 1,905,166, dated April 25, 1933, Serial No. 552,358, July 22, 1931. Application for reissue April 26, 1933. Serial No. 667,989

4 Claims. (Cl. 155—184)

This invention relates to edge foundation material for upholstery over which the upholstery covering material is drawn, and has for an object to produce such a material, which, when used on the seat edge, will insure a close joint between the finished edge and the margin of a superposed cushion.

A further object is to produce an edge having an elongated rounded bead portion for supporting the covering material and an attaching fin extending from said bead portion and arranged at an angle to the central plane of the bead portion.

For a more complete understanding of this invention, reference may be had to the accompanying drawing in which Figure 1 is a fragmentary perspective of material which may be used to form a portion of the edge.

Figure 2 is a fragmentary inverted plan of a strip cut from the material of Figure 1.

Figure 3 is a perspective showing the strip of Figure 2 with a core strip secured thereto.

Figure 4 is a plan showing the completed edge.

Figure 5 is a detail section showing the edge as applied to a seat, the section being taken on line 5—5 of Figure 4 and showing a slight modification.

Figures 6 and 7 are views similar to a portion of Figure 5 but showing modifications.

Figure 8 is a detail section through a forward portion of a chair or the like embodying an edge constructed in accordance with this invention and showing a portion of the seat cushion.

Figure 9 is a view similar to Figure 8, but showing a different seat construction and in accordance with Figure 5.

Referring to the drawing, Figures 1 to 4 show a preferred construction of upholstery edge. Referring to Figure 1, at 1 is indicated a layer of fabric such as burlap denim or other suitable material supporting a layer of loosely felted material such as jute, hair, fiber, moss, cotton, sisal, hemp, excelsior, or any kind of material suitable for use as filling for upholstery purposes, as at 2. Over strip areas 3 spaced widthwise of this material the felt is preferably condensed and intimately united with the fabric as by the well known needling operation, while between these areas 3 are strip areas 4 in which the felt is in loose condition. This material is then cut midway of the areas 3 to form a plurality of strips as shown in Figure 2, each having a central portion of loosely felted material as 4 and marginal portions where the felted material has been compacted and united intimately with the fabric.

Centrally of the portion 4 is then laid a strip 5, as shown in Figure 3, which preferably also comprises a strip 6 of felted material preferably united to a strip 7 of fabric such as burlap, as by needling, for ease in handling. The strip 5 is then attached to the underlying wider strip as by the lines of stitching shown at 8 and 9. The material is then folded up into the form shown in Figure 5 with the marginal edge portions of the wider strip brought into overlapping relation and secured together as by the lines of stitching 10 and 11 and the over edge stitching 12. A line of stitching 13 is also, preferably, passed through both strips of material, the inner strip forming a core within the fold of the wider strip, the two together forming a bead 15 of elongated cross section from which extends at an obtuse angle the overlapping portions of the wider strip which form a fin 16. That portion of the fabric on the inner side of the angle is narrower than that portion on the outer side of the angle and the stitching which compresses the fibrous material and holds the edge in angle shape passes through the bead portion approximately at right angles to its long axis and through the fin portion approximately at right angles to its direction. The lower face of the fin 16 therefore forms an obtuse angle with the bead and the central plane of the long cross sectional axis or diameter of the bead which passes through the root of the attaching fin is also at an angle to the length of the fin.

If desired, also, a line of stitching as 19 may be passed through the material inwardly of the juncture between the faces 16 and 17 adjacent to the outer apex of the angle therebetween and, if desired also, a cord shown at 20 in Figure 7 may be inserted in this edge portion. This stitching 19 with or without the cord forms a rib or fin portion through the root of which stitching as 21 may be passed (see Figure 5) to secure the edge to the upper wire frame member 22 of an article of furniture, this frame member being spring supported from a lower base or frame member 23 as shown in Figure 9.

If desired also a strip of fabric such as burlap at 25 may have its upper edge portion secured to the forward face of the bead, as by the line of stitching 9, and its lower edge may extend downwardly sufficiently far so that it may be secured to the forward edge of the base 23 where a spring supported upper frame is employed, or, where no such upper frame is employed and the attaching fin is seated directly on the base frame 23 as shown in Figure 8, this strip of burlap may be secured directly to its forward face if it is desired to use such a strip.

In place of forming a core within the folded covering portion of a single rectangular strip of material folded on itself it may be otherwise formed, as for example, in Figure 6 the core 30 is shown as of substantially triangular cross section, suitable stitching such as 31, 32 and 33 passing through the core and the cover portion securing the parts together, or the core may be formed of a plurality of members, for example, rope, cord or other suitable material such as is shown at 35, 36 and 37 in Figure 7, stitching as at 38, 39, and 40 securing the parts together, so long as the upholstery edge is in this general shape having a bead portion having its forward face extending at an obtuse angle to the base of the attaching fin. Such a construction, extending outwardly and upwardly acts to support the upholstery covering material, such as 41 in Figures 8 and 9, at the forward edge of the seat portion elevated sufficiently so as to allow the top 41 of the seat on which the cushions 42 are to be placed to sag so as to permit the forward edge portions 43 of such cushions to rest closely against the upholstery covering material and make a tight joint therewith, which adds much to the appearance of the furniture.

In the construction shown in Figures 5 and 7 the shape of the bead is determined by the placing of the stitching with reference to the core, and in the construction of Figure 6 the core may be shaped up from bulk material. In all these constructions the cores and covering portions may be formed up substantially without waste to produce a resilient edge which is not easily permanently distorted under pressures to which it is subjected in service.

It will be noted that the covering material shown as comprising the layer of felt and its reenforcing fabric constitutes a sheet material covering for the core and that the attaching fin includes not only the reenforcing fabric, but also a double layer of felt which acts as a fibrous filler within the fabric covering of the fin. The stitching passed through the fin then binds its constituent parts into a structure of substantial strength, body and stiffness from which the bead portion may be retained extended at an obtuse angle even when the edge is subjected to a reasonable amount of deforming stress. The fin also presents a portion of substantial strength to receive the attaching means by which the edge is secured to the article of furniture.

From the foregoing description of certain embodiments of this invention, it should be evident to those skilled in the art that various other changes and modifications might be made without departing from the spirit or scope of this invention as defined by the appended claims.

I claim:

1. An edge comprising a bead portion of elongated cross section and a fin portion of substantial body but of less thickness than said bead portion extending at an angle to the long cross sectional axis of said bead portion, said edge comprising fibrous material and a sheet material covering therefor, the sheet material on the inner side of said angle being narrower than on the outer side of said angle, and stitching passed through said edge approximately at right angles to the fin and to the long cross sectional axis of said bead portion, whereby to compress said fibrous material and to retain said bead portion and fin in said angular relation.

2. An edge comprising a bead portion of elongated cross section and a fin portion of substantial body but of less thickness than said bead portion extending at an angle to the long cross sectional axis of said bead portion, said edge comprising fibrous material in both the bead and fin portions and a sheet material covering therefor, the sheet material on the inner side of said angle being narrow than on the outer side of said angle, and stitching passed through said edge approximately at right angles to the fin and to the long cross sectional axis of said bead portion, whereby to compress said fibrous material and to retain said bead portion and fin in said angular relation.

3. An edge comprising a layer of felted material and a fabric folded to bring its marginal portions into lapping relation and secured together to form an attaching fin, a filler within the folded portion back from said fin to form with said folded portion a bead thicker than said fin, and stitching passed through said bead in position to shape said bead into elongated cross section and to hold said bead with its long cross sectional axis extended at an obtuse angle to said fin.

4. An edge comprising a layer of felted material and a fabric folded to bring its marginal portions into lapping relation and secured together to form an attaching fin, a filler within the folded portion back from said fin to form with said folded portion a bead thicker than said fin, stitching passed through said bead in position to shape said bead into elongated cross section and to hold said bead with its long cross sectional axis extended at an obtuse angle to said fin, and stitching passed through said edge adjacent to the outer apex of said obtuse angle and defining an edge-securing rib.

HARRY FOX.